(No Model.) 10 Sheets—Sheet 2
J. A. SALADIN.
APPARATUS FOR TURNING MALT.

No. 440,850. Patented Nov. 18, 1890.

Witnesses: Inventor (No Model.) 10 Sheets—Sheet 4.

J. A. SALADIN.
APPARATUS FOR TURNING MALT.

No. 440,850. Patented Nov. 18, 1890.

Witnesses,

Inventor, (No Model.) 10 Sheets—Sheet 7.

J. A. SALADIN.
APPARATUS FOR TURNING MALT.

No. 440,850. Patented Nov. 18, 1890.

(No Model.) 10 Sheets—Sheet 8.

J. A. SALADIN.
APPARATUS FOR TURNING MALT.

No. 440,850. Patented Nov. 18, 1890.

Witnesses,

Inventor,

UNITED STATES PATENT OFFICE.

JULES ALPHONSE SALADIN, OF NANCY, FRANCE.

APPARATUS FOR TURNING MALT.

SPECIFICATION forming part of Letters Patent No. 440,850, dated November 18, 1890.

Application filed February 23, 1888. Serial No. 264,991. (No model.)

*To all whom it may concern:*

Be it known that I, JULES ALPHONSE SALADIN, a citizen of France, residing at Nancy, in the Department of Meurthe et Moselle, France, have invented a new and useful Improvement in Apparatus for Turning Malt, of which the following is a specification.

This invention relates to automatic or mechanical apparatus for turning over, lifting, and dividing a mass of germinating grain in a case in order to enable the air to circulate more freely therein.

The principle upon which this invention operates is set forth in Letters Patent of the United States, granted to me June 19, 1877, and numbered 192,292; and the present invention comprises certain improvements in the turner consisting of helices or screws, which by their rotary movement, combined with a translatory movement of their axis, produce the turning over and lifting up, and consequently the perfect division, of the mass of grain.

The invention is illustrated in the accompanying drawings, in which—

Figure 1 is a sectional elevation of the traveling turner or stirrer; Fig. 2, a detail illustrating the driving-pulleys. Figs. $1^a$ and $1^b$ are detail views illustrating the means for driving the worm-shaft; Figs. 4 and 5, sectional details of the upper part of turner-shaft; and Figs. 6, 7, $7^{bis}$, 8, and 9, details of other parts, as hereinafter described. Fig. 10 is a view, similar to Fig. 1, of a modified arrangement; Fig. 11, a detail of the tubular support; Fig. 12, a sectional elevation similar to Fig. 3; Figs. 13 and 14, details in section of the screw-shafts and connections; Fig. 15, a view of the valve, and Figs. 16 to 19, details of other parts of this modified arrangement. Figs. 20 to 26 illustrate the case in which the grain is treated, Fig. 20 being a sectional elevation; Figs. 21, 22, 23, and 24, details; Fig. 25, a sectional plan, and Fig. 26 an outline plan.

The turner is composed, essentially, of a number of vertical shafts G, at the lower extremities of which there are attached helical blades $G^8$, forming turning-screws, which lift the grain. The vertical shafts are carried by a cylindrical or tubular frame A, and receive motion from a series of worms $H^3$ and worm-wheels $G^2$, driven by a cord and pulleys.

Figure 3:
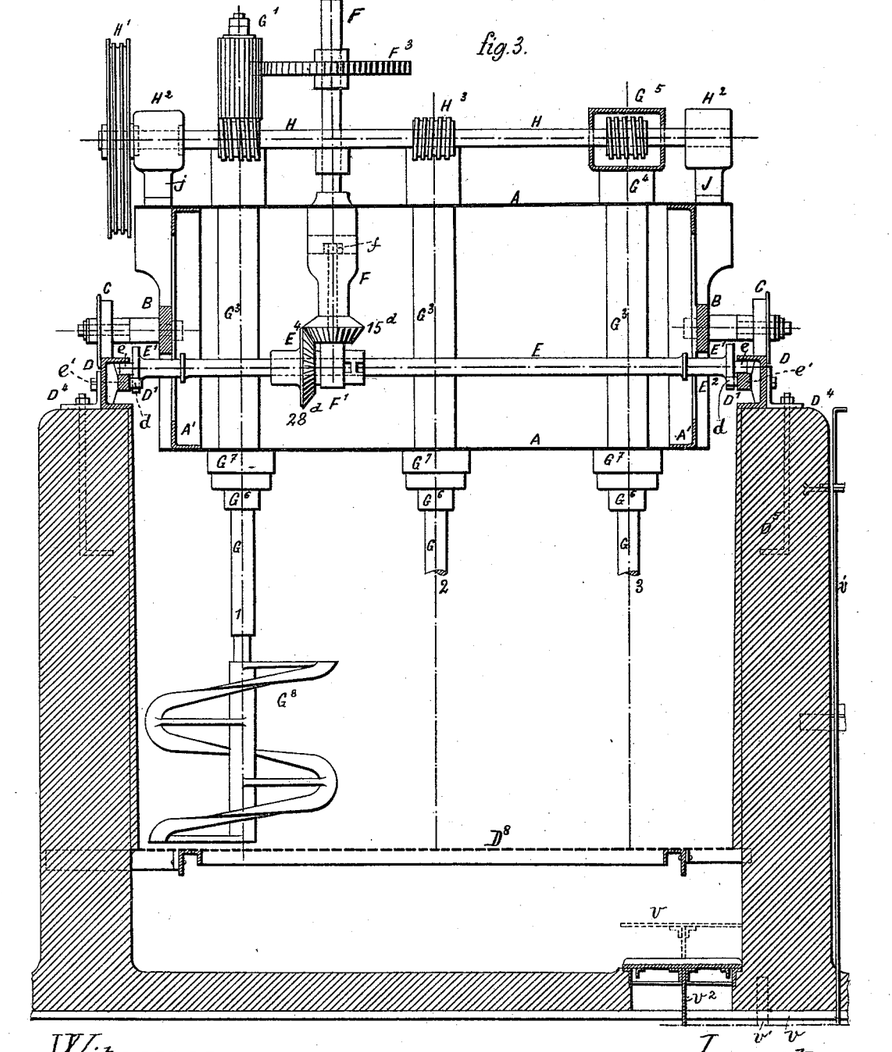
Fig. 3, a cross-section of the case, showing the turner in elevation.
Figures 10, 11, 13, 16:
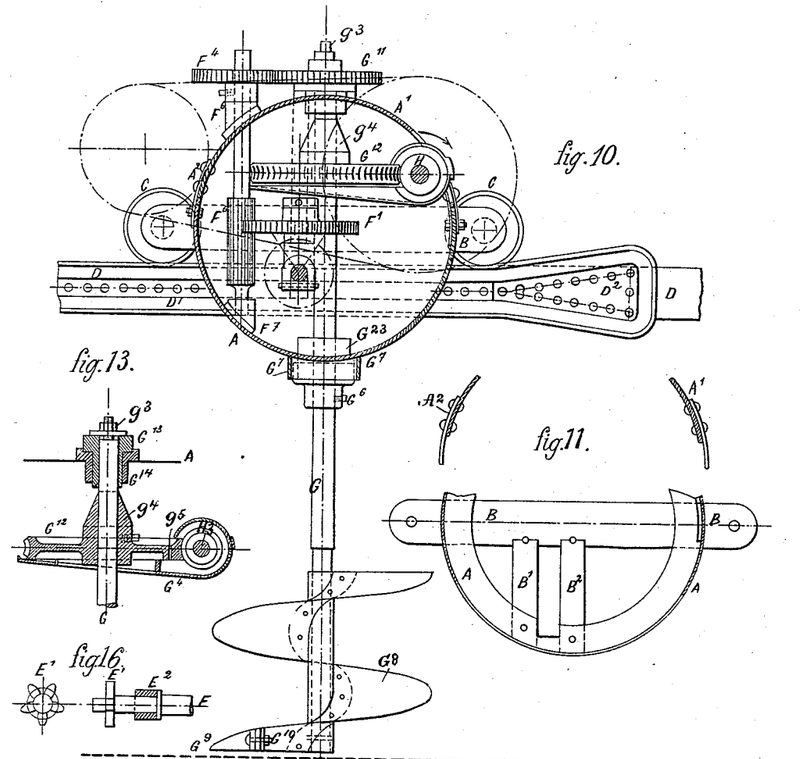

The tubular or cylindrical frame A is made of sheet-iron, and is supported on four rollers C. These rollers are attached by transverse bars or bearers B, bolted to an angle-iron A', riveted to the cylinder A. I also employ cast-iron collars or head-pieces, Fig. 9, for riveting on the tubular frame A, and which are made in one piece with the transverse pieces B. This simplifies the construction. The rollers C travel on the rails D, and the tubular frame A is traversed or caused to move laterally by a pinion E', which works in a rack D' fixed to the rail D. The entire apparatus travels laterally from one end of the case to the other, together with the rotating helices or turning-screws $G^8$. These screws may be made in two ways, for example: first, they may be made from a metal helix cast in one piece with the central boss, as illustrated in Fig. 3, the boss being fixed to the shaft G, supporting the whole; second, a helical strip of sheet-iron bent up when hot may be riveted on a brass or gun-metal boss. The helical surface may also be of cast-iron or gun-metal. At the lower part of the screw there is a plain portion $G^9$ at right angles to the axis, Fig. 8, for the purpose of cutting into the mass of grain to facilitate the raising of the latter onto the helix. This part of the screw is called the shovel.

Figures 1, 2, 4, 5, 6, 7, 8, 9:
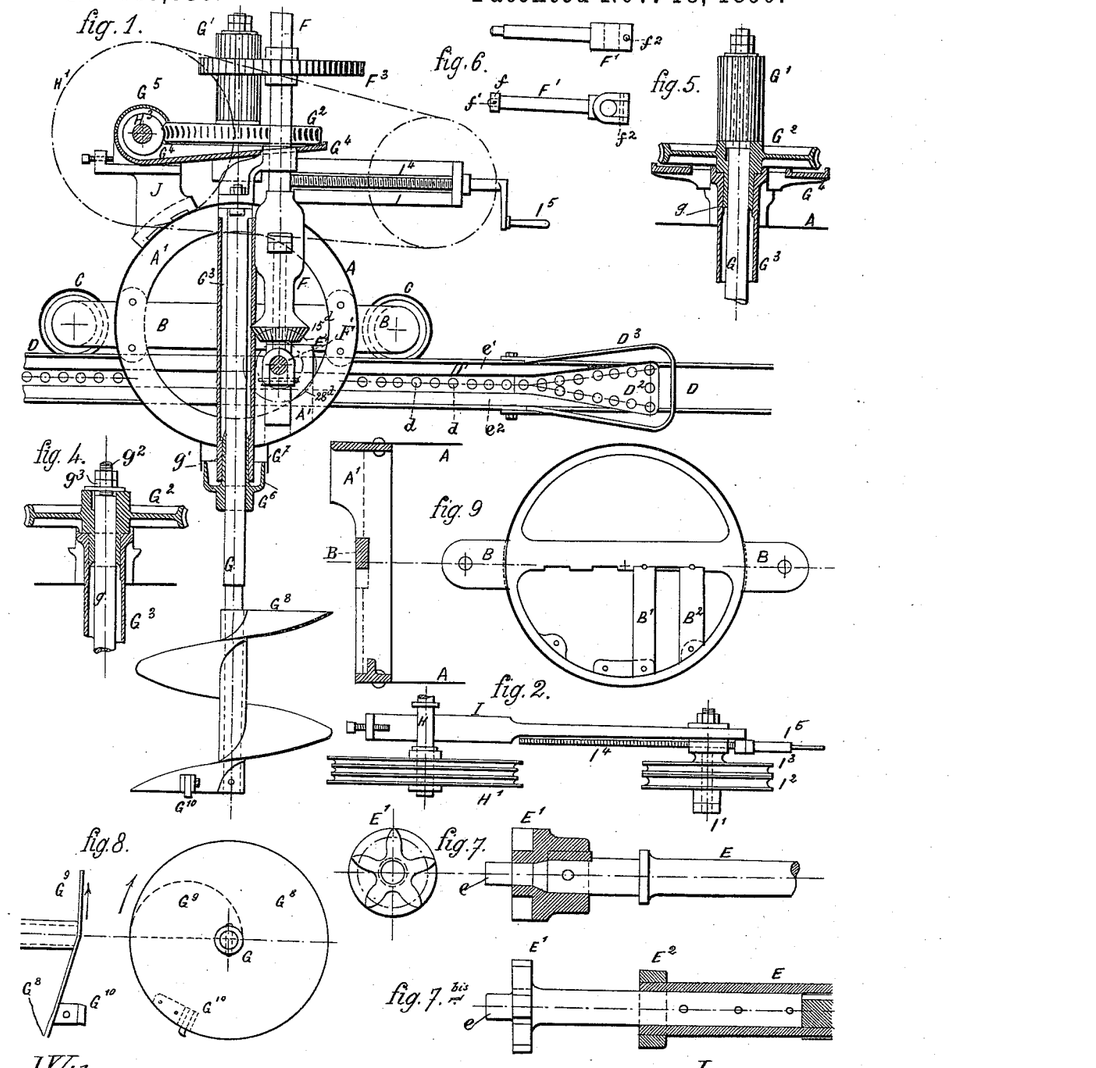
Figures 1A, 1B:
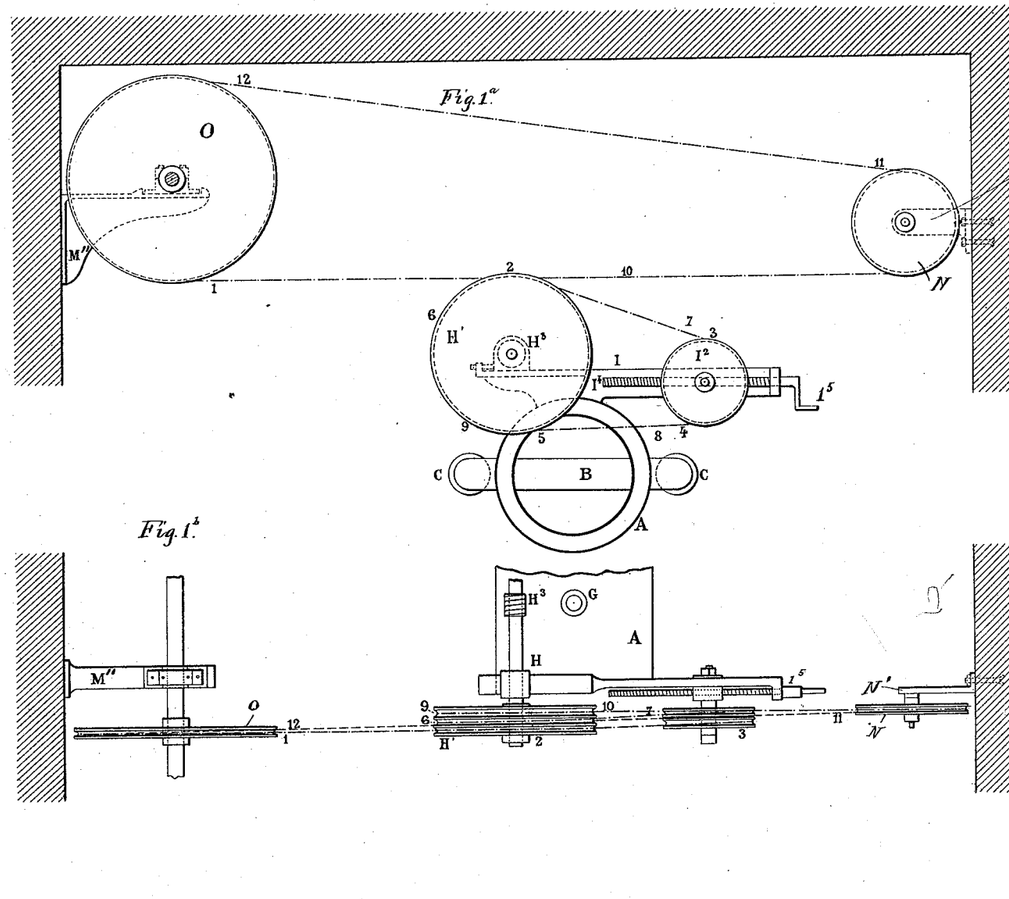

At $G^{10}$, Fig. 8, there is a bracket fixed to the under side of the screw at right angles by rivets and carrying a rubber scraper secured by a plate and bolt. This rubber scraper works in contact with the perforated plate or bottom $D^8$, which supports the grain, and also against the sides of the case, so as to move all the grain that the shovel (which is elevated about fifteen millimeters above the bottom) may have passed over. This grain accumulates in front of the scraper and forms a ridge which is taken up in part at least by the shovel. These succecsive actions of sweeping and taking up result in causing all the grain to pass over the shovel, so that none is left stationary. This action is of the greatest importance, as it renders the turner absolutely efficacious in its action.

I do not limit myself to the particular forms or shapes of screws herein indicated, which are merely given by way of example. The axes of the helices are supported and guided by cast-iron sleeves or tubes $G^3$, arranged vertically across the tubular frame. A wheel $G^2$, Figs. 4 and 5, which imparts motion to the shaft, rests upon the upper end of the tube $G^3$. The boss of this wheel works in a socket in the tube $G^3$, the bearing or frictional surfaces being suitably lubricated. The bore of tube $G^3$ is enlarged, as indicated at $g$, so that the oil is prevented from reaching the shaft and runs down in the interior of the tube. On reaching the lower part of this sheath or tube $G^3$ the oil is received in a second tube or collar $g'$, Fig. 1, carried by the shaft G, but made conical on its upper side. The oil arriving here cannot ascend the incline of this cone so as to reach the shaft, but runs into the lower part of the collar and finally falls into the cup $G^6$, formed in the latter, from which it may be removed from time to time by a small syringe or otherwise. By these means injury to the grain by oil running down the shaft is obviated. A collar $G^7$, projecting from the support A, forms a cover to the oil-cup $G^6$. The wheels $G^2$, employed to turn the shafts G, are driven by worms $H^3$, carried by a shaft H. One of these wheels $G^2$ (the one nearest the driving-pulley $H'$) is provided on its upper side with a long pinion $G'$, whose functions are hereinafter described. The upper end of each shaft G is screw-threaded, as shown at $g^2$, Fig. 4, and the shaft is secured to the wheel, by which it is supported by nuts $g^3$. The shafts G can thus be adjusted vertically to bring the helices $G^8$ the proper distance above the bottom of the case.

The shaft H, carrying the worms $H^3$ and driving-pulley $H'$, is supported in bearings $H^2$ on opposite ends of the frame A. The bearings are inclosed in a case to prevent oil running from the bearings into the grain.

Referring to Figs. $1^a$ and $1^b$, it will be seen that the cord (represented by a broken line) coming from pulley O, whose shaft is supported in bracket $M''$, passes over the three-grooved pulley $H'$ in the first groove (lower groove, Fig. $1^b$) to and around pulley $I^2$. Returning to pulley $H'$, it passes again around it, this time in the middle groove, and then around pulley $I^3$. It passes the third time around pulley $H'$ and thence around pulley N, whose shaft is supported in a bracket $N'$, and finally back to pulley O. The small figures 1 to 12 indicate progressively the winding of the cord and enable its progress to be readily traced. This arrangement is adapted to drive pulley $H'$ more surely. Pulleys $I^2 I^3$ work on a stud $I'$, Fig. 2, fixed in a long slot in the support I. A screw $I^4$, worked by a small crank $I^5$, enables this stud to be shifted when it is desired to stretch or slacken the cord. The long pinion $G'$ drives a wheel $F^3$, placed on a vertical shaft F, which passes through the side of the tubular support or frame and meets a horizontal shaft E. A pin or a fork $F'$, embracing the shaft E, has a bearing in a hole bored in the lower end of shaft F, being connected with the shaft F by a ring $f$ and pin $f'$, and secured in position on the shaft E by a cross-bar $f^2$, connecting the ends of the fork. (See Figs. 1, 3, and 6.) By these means the shaft F is compelled to move upward and downward with the shaft E. The shaft F carries a bevel-wheel $15^d$, gearing with a corresponding wheel $E^4$, fixed on shaft E. The latter shaft is provided at each end with a toothed pinion $E'$. The shaft E is also provided at each end with a stud or pin $e$, which enters a groove or slot $e'$ $e^2$, formed in the side of the rack $D'$, and the teeth of pinion $E'$ gear with the teeth $d$ of this rack. There is a groove or slot $e'$ above, and another $e^2$ below, the rack $D'$.

Figs. 7 and $7^{bis}$, which will be readily understood, illustrate two modes of fixing the pinions $E'$ on the shaft E. The said shaft E carries guide-blocks $E^2$, which slide between two guides $B'$ $B^2$, Fig. 9, attached to the main horizontal bearers B, connected to the extremities of the tubular support A and provided with the rollers C, traveling on rails D, as already described. It will be seen that, supposing the pinion E to be always turning in the same direction, the direction of motion of the apparatus will depend on whether the studs or pins $e$ are traveling in the groove $e'$ above rack $D'$ or in the groove $e^2$ below the same.

In order that the pins or studs $e$ may pass from the upper to the lower groove, and vice versa, and the apparatus be made to travel continuously from one end of the case to the other without reversing the motion of the pinion, the rack is furnished with a triangular portion $D^2$ at its ends, surrounded by a plate $D^3$, which acts as a guide for the stud $e$. When the pinion $E'$ reaches this triangular part—being on the upper side of the rack, for example—it first ascends the incline formed at this point and then works down the vertical part at the extreme end until the stud $e$ enters the lower groove $e^2$ and pinion $E'$ engages rack $D'$ on the under side of the latter. As the pinion works down the vertical part, the apparatus is stationary. The shaft E has the requisite vertical gear to permit these movements by reason of the guide-blocks $E^2$, sliding between the guides $B'$ $B^2$, and the shaft F rises and falls with shaft E, as already explained. A plate $G^4$, Figs. 1 and 3, extends under the wheel $G^2$ for the purpose of catching oil, and the plate $G^4$, being inclined, conducts the oil to the worm $H^3$, which also has a cover $G^5$.

Figures 20, 21, 23:
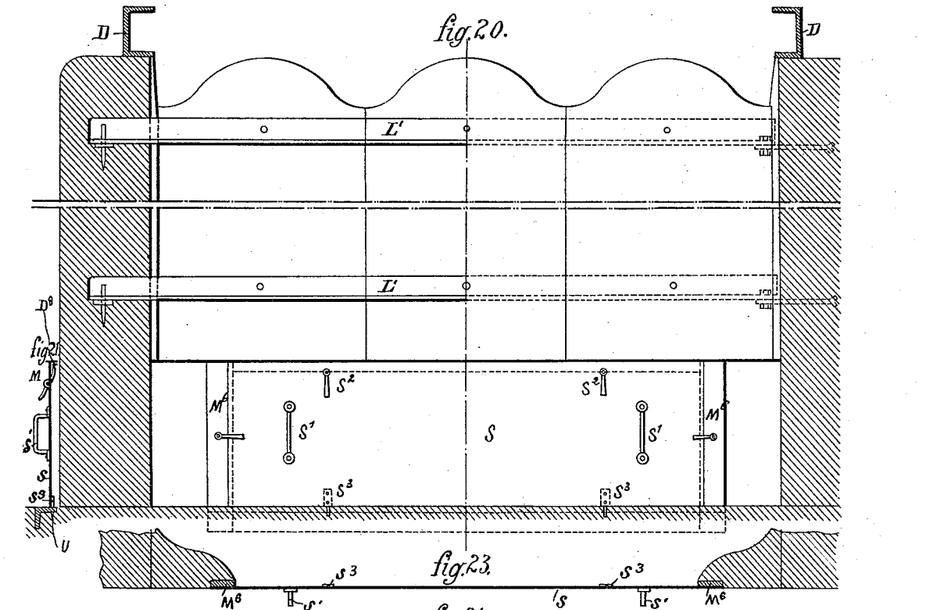
Figure 22:
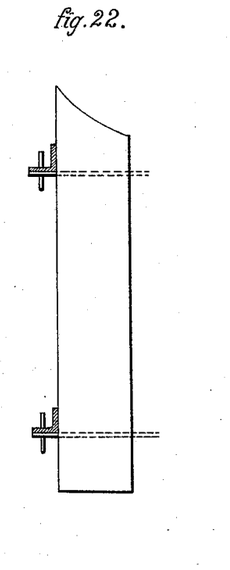
Figures 24, 25:
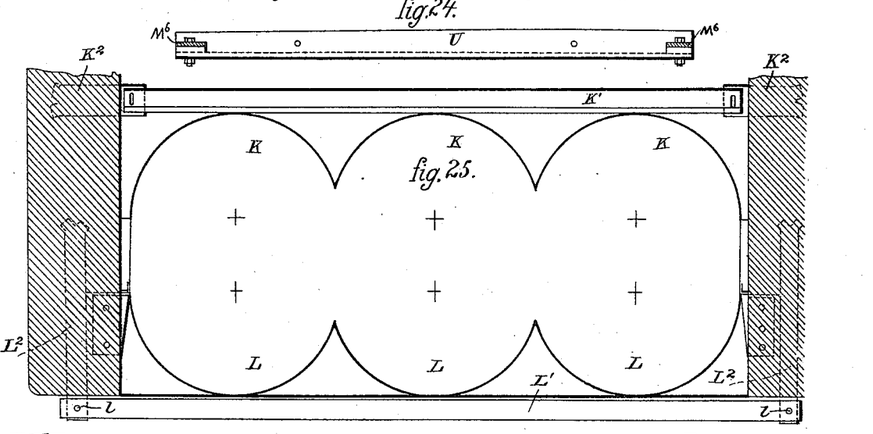

Figs. 20, 22, and 25 show the form of the recesses in the ends of the cases for the reception of the turning-screws. These recesses, which embrace the turning-screws at the end of their travel, are of two sorts. The walls of the back recess K are fixed and those of the front recesses L are movable. The recesses correspond in number to the number of turning-screws $G^8$. The walls of recesses K are fixed to two bars K', bolted to holdfasts $K^2$, embedded in the masonry. The movable walls of the front recess L form doors, which can be opened, when necessary, in order to remove the grain. With this object these recesses are attached to transverse bars L', supported by bars $L^2$, fixed in the side walls, the bars L' being connected to bars $L^2$ by pins $l$, which can be readily removed.

To prevent the compressed air under the perforated floor or bottom of the case from escaping at the front, it is necessary to have a door at this point. For this purpose I employ a door S, Figs. 20 to 24, fitting against a bottom plate U and uprights M, and against the flange or edge of the perforated bottom $D^8$. This door has handles S', and is secured in position by pins $S^3$ and turn-buckles $S^2$. When the cases are of considerable width, these doors may be made in two pieces arranged side by side.

Figures 12, 15, 17:
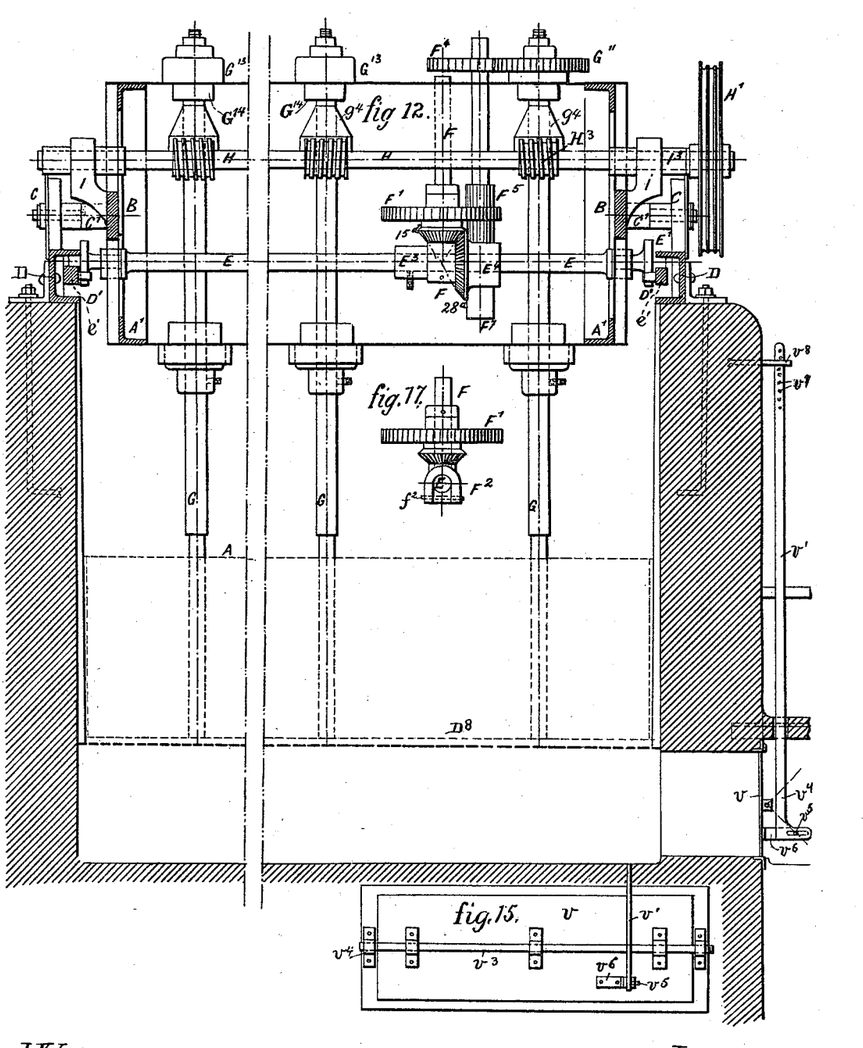
Figure 14:
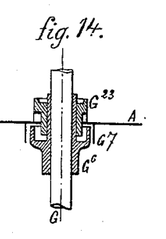
Figure 18:
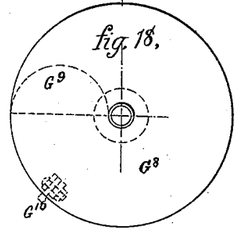
Figure 19:
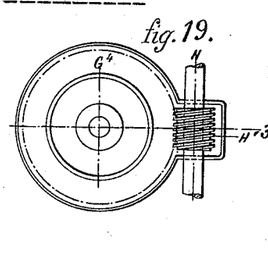

The air for ventilating the grain is supplied under each case through valves V, which may be arranged as shown in Fig. 3, or as in Fig. 15. In Fig. 3 is shown a lifting-valve operated from a rod V' through a lever $v$, pivoted at $v'$ and connected with the valve-stem $v^2$. The valve V in Figs. 12 and 15 is vertical, and is carried by a spindle $v^3$, turning in brackets $v^4$. The operating-rod V' is slotted at its lower end and engages a pin $v^5$ on an arm $v^6$, attached to the valve. The valve can be held in any desired position by the engagement of pins $v^7$ with the projecting arm $v^8$, set into the masonry.

Figures 27, 28:
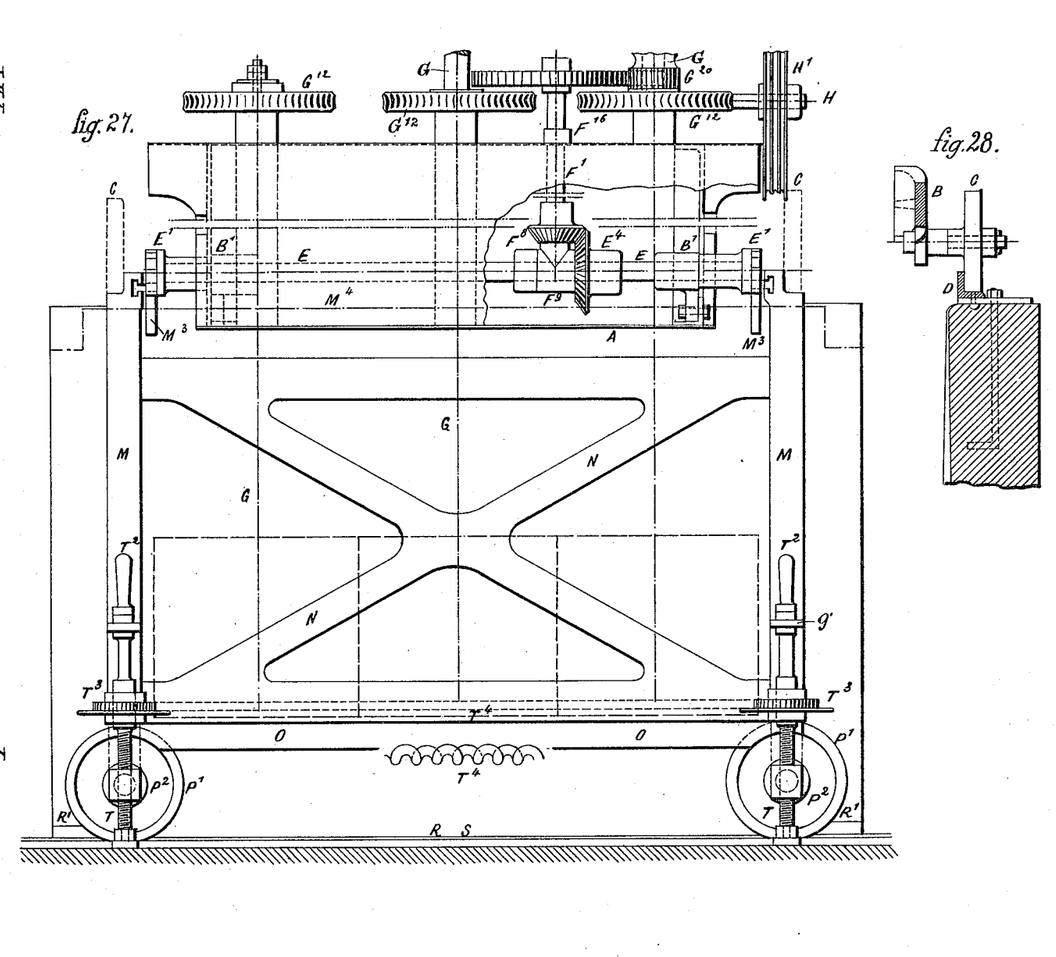
Figs. 27 to 35 illustrate an apparatus designed to be carried from one case to another and means for transporting the same, Fig. 27 being an elevation, Fig. 28 a detail of the rail and wheel, Fig. 29 a side view, Fig. 30 a detail, Fig. 31 a top view of the rails, Fig. 32 a plan view of the transporting-carriage, Figs. 33 and 34 detail diagrams of the racks, and Fig. 35 a detail showing mode of closing the end of case.
Figures 29, 30:
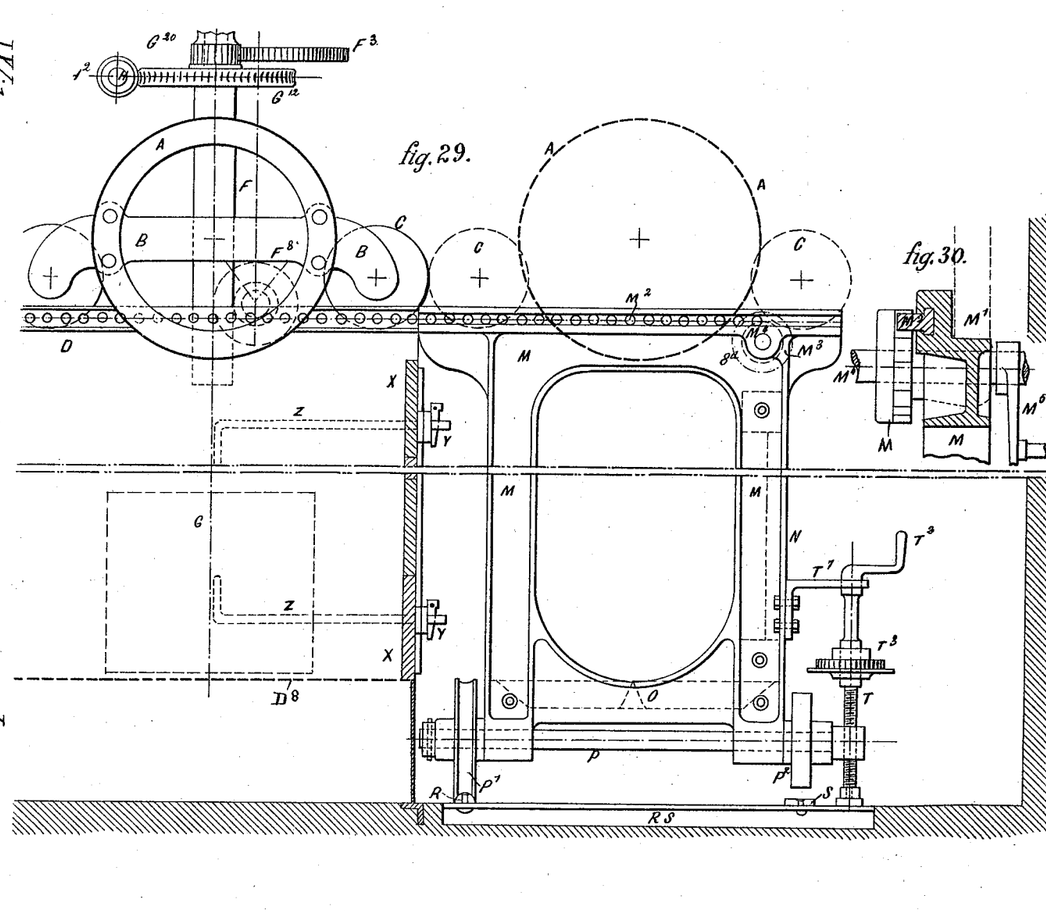

Figs. 10 to 19 illustrate a turning apparatus composed of the same essential parts as that shown in Figs. 1 to 9, but somewhat differently arranged in order to diminish the height. The tubular support A is made in two parts connected by plates and bolts $A^2$, as clearly shown in Fig. 11. On this frame are fixed bushes $G^{14}$, in which work collars $G^{13}$ by means of nuts $g^3$, so as to enable the height of the turning-screws $G^8$ above the floor to be properly adjusted. The vertical bearings at $G^{14}$ and $G^{13}$ are lubricated, and the oil is prevented from getting to the shaft G by precautions similar to those already described. The wheel $G^{12}$ is arranged in the interior of the tubular frame A, and the upper side of the hub of the wheel forms a cone $g^4$, which receives the oil dripping from $G^{13}$. The oil descends into the disk or plate of the wheel $G^{12}$, whence it flows through a small hole $g^5$ into a fixed plate $G^4$, Fig. 13, where it serves to lubricate the screw or worm $H^3$. The shafts G of the turning-screws $G^8$ have bearings in bushes $G^{23}$, Fig. 14, carried by the tubular frame A, through which is passed a sleeve or collar $G^6$, provided with an oil-cup. As before, the collar $G^6$ is provided with a cover $G^7$. The motion of pulley H' with three grooves is transmitted to the pinion $G^{11}$ by the intervention of worm $H^3$ and wheel $G^{12}$, transmitting motion to the gearing G' $F^4$ $F^3$ $F^5$ F' and bevel-gears $15^d$ and $E^4$, the latter being keyed on shaft E, whereby the pinions E' are turned and the apparatus moved longitudinally in the case. Shaft F has bearings in bushings $F^6$ $F^7$, attached to the tubular frame A. (See Fig. 10.) When it is desired to employ a single turning apparatus for a number of germinating-cases, it is necessary, in order to transfer the apparatus from one case to another, to employ a traveling carriage, this arrangement constituting a portable turning apparatus. Figs. 27 to 35 illustrate this arrangement. The turning apparatus proper is substantially as hereinbefore described, but for greater convenience the traveling rollers C are made larger, which necessitates a modification of the bearers B, whose shape is shown in Fig. 29. The rack D' is carried by a plain L-angle iron. The pinion E' always engages the upper side of the rack D', the back-and-forth motion in this case being obtained by the use of reversible wheels which change the direction of motion. The movement of pulley H' is transmitted from the screw-shaft H to the train of gearing $G^{12}$ $G^{20}$ $F^8$ $E^4$. Pinion $G^{20}$ can be transferred to either of the two first turning-shafts G, and as these shafts turn in opposite directions it is easy to cause the apparatus to move forward or backward, as may be desired, by putting pinion $G^{20}$ on one or the other of these two shafts. Adjacent shafts G are made to turn in opposite directions, so as to maintain the heap of grain in place on the bottom of the case. When the mechanical turner has arrived at the end of its travel and it is desired to transfer it to another case, the driving-cord is put out of gear and a traveling carriage M N O is brought up to the end of the case, as indicated in Figs. 27 and 29. This carriage is composed of a frame M N O traveling on two axles P, carrying wheels or rollers P' $P^2$, running on rails R S, which are laid in a direction at right angles to the length of the germinating-cases. One of the rollers P' has a semicircular groove in its periphery, and the tread of the corresponding rail is made of suitable shape to fit into this groove. The tread of the other wheel $P^2$ is flat and works on a flat rail S. Both rollers are loose on their journals. To raise the carriage to a horizontal position, a lifter is employed, consisting of a screw T, working in a support T' and turned by a crank-handle $T^2$. When the carriage is in motion, it is slightly inclined or tilted away from the ends of the cases, owing to the wheels $P^2$ being smaller in diameter than wheels P', so that the carriage can move freely without liability of catching against the ends of said cases; but when the carriage has been brought up to the end of a case for the removal of the mechanical turner the wheels P' P² are scotched by wedges R' S', Figs. 27 and 32. The screws T are then rotated by means of the handles in such manner as to raise the side of the carriage. The carriage turns on the semicircular tread of the rails R as on a center, and the upper part of the carriage is brought up close to the case so that the rails M' form continuations of the rails D on the case, Fig. 29. One man standing on the side of the carriage can turn both lifting-screws T simultaneously by means of an endless chain T⁴, working on sprocket-wheels T³ on the axis of the screws T. The carriage has two angle-irons M', acting as rails, on which the rollers C of the mechanical turner can travel. In a dovetail or undercut groove in this rail there slides a rack M², adapted to be pushed out so as to meet and form a continuation of rack D'. Rack M² is slid out by means of a toothed pinion M³, fixed on a shaft M⁴, which can be rotated by a crank-handle M⁵. When the ends of sliding racks M² meet stationary racks D' on the case, the operator removes the driving-pinion G²⁰ and by turning wheel F³ by hand causes the turner to travel onto the carriage. The operator then turns screws T so as to lower this side of the carriage until wheel P² bears on its rail S. The carriage can then be wheeled to the next case and fixed in position, as hereinbefore described, and the apparatus is transferred from it to the next case.

Figures 31, 32, 33, 34, 35:
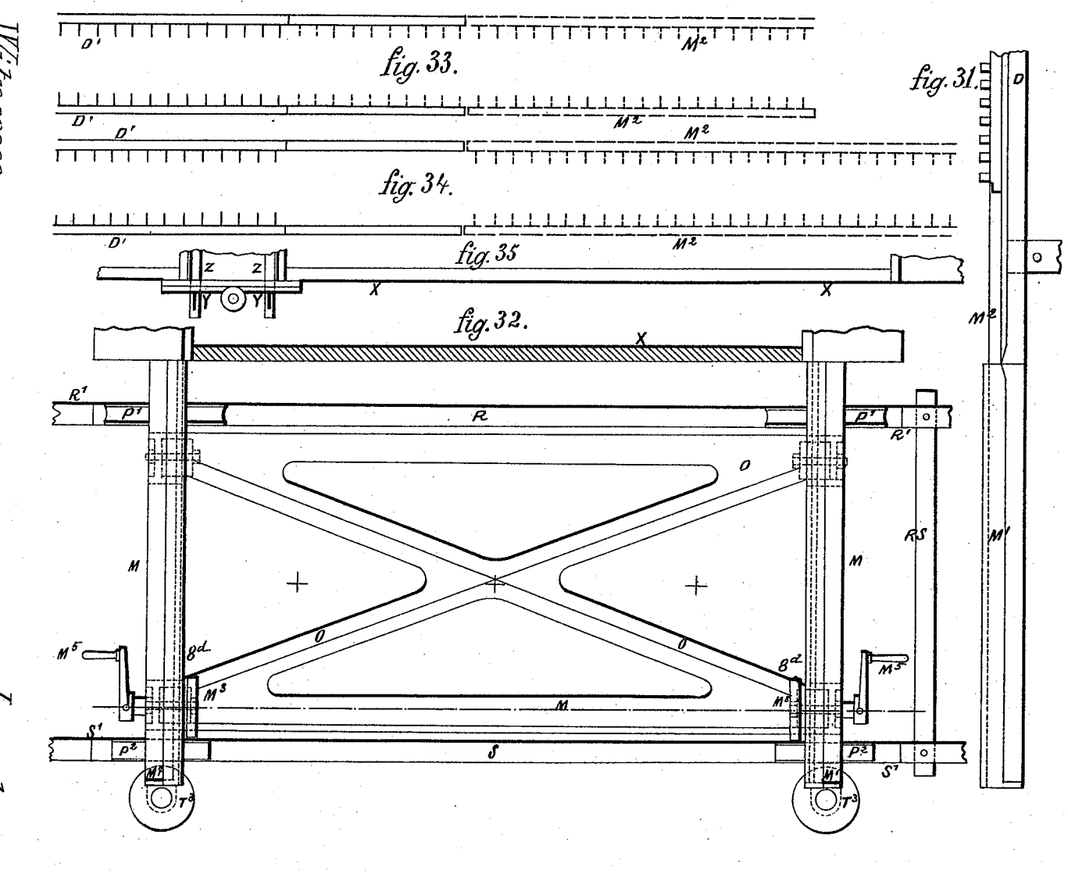

Fig. 29 represents the carriage placed at the end of a case and scotched in place, and the racks M² pushed out to meet the stationary racks D'. Fig. 33 is a diaphragm showing how the racks are arranged to facilitate the passage of the turner from the case to the carriage, and vice versa. Fig. 34 is a similar diaphragm showing how the racks of the carriage are drawn back to enable the latter to be wheeled laterally from one case to another.

In Figs. 35 and 29 are shown the manner of closing the end of the case. The boards X are secured by bolts Z and pins Y.

Figure 26:
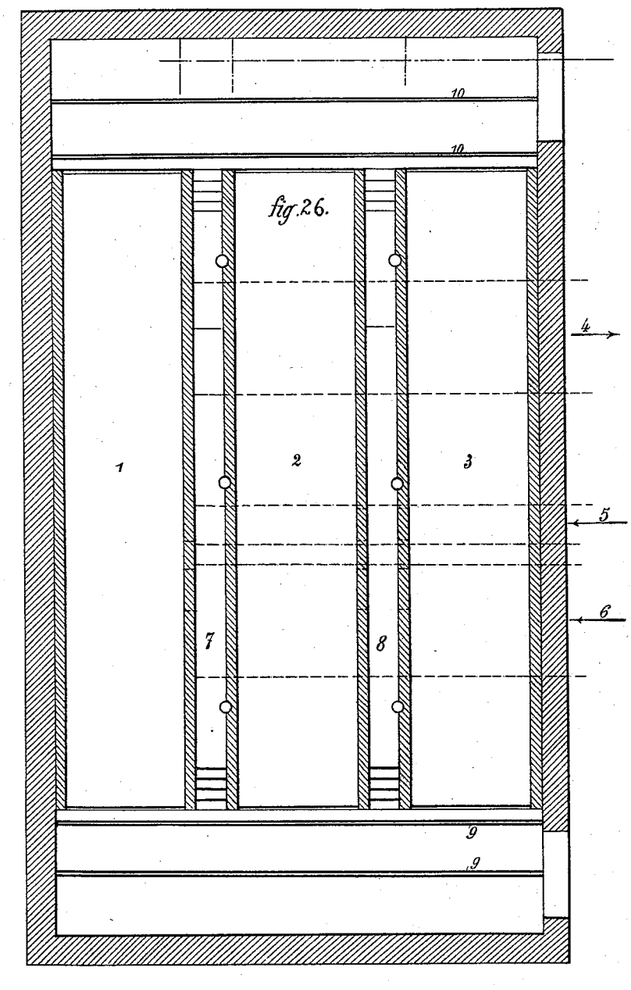

In Fig. 26 is represented an outline plan of a mechanical malt-house fitted with three germinating-cases and a portable mechanical turner.

The direction of the vitiated air is indicated by the arrow 4, the direction of the dry air by arrow 5, and that of the damp air by arrow 6.

Passages with open wood-work are provided at 7 and 8 to facilitate inspection of the grain, and the rails for the carriage are indicated at 9 and 10.

Having now fully described my said invention, what I claim is—

1. In an apparatus for turning malt, the combination, with operating mechanism, of a series of helices having each at its lower end a plain portion constituting a shovel a short distance above the bottom of the malt-containing vessel, and provided with a scraper beneath the shovel adapted to work in contact with the bottom of said vessel, substantially as described.

2. In an apparatus for turning malt, the combination of a containing-vessel, a frame movable with respect to said vessel, a series of upright shafts carried by and movable with said frame, malt stirring or turning screws on said shafts, and gearing for rotating said shafts so that adjacent screws turn in opposite directions, substantially as described.

3. In a malt-turner, the combination of the case, the frame supported on rollers, the turning screws on vertical shafts carried by said frame, gearing for rotating said screws, stationary racks on the sides of the case, pinions engaging said racks, a pinion carried by one of the vertical screw-shafts, and connections, as specified, between the same and the pinions engaging said racks, whereby the apparatus is moved longitudinally, substantially as described.

4. The combination of the vertical screw-shafts carried by a frame supported on rollers, pinions on a horizontal shaft, fixed racks which said pinions engage on the upper side when the frame moves in one direction and on the lower side when it moves in the reverse direction, and a vertical shaft carrying gears engaging gears on said screw-shaft and horizontal shaft, respectively, and being capable of a longitudinal motion in its bearings, so as to accommodate itself to the position of said horizontal shaft, substantially as described.

5. The combination, with the receptacle for the malt, said receptacle being provided with longitudinal rails, of a frame having rollers adapted to run on said rails, the stationary racks formed each by a row of pins extending along the side of the case, the pins being arranged in a loop or triangle at each end, and pinions carried by a horizontal shaft and adapted to engage said racks on the upper side when the frame moves in one direction and on the lower side when moving in the opposite direction, whereby continuous motion may be imparted to said frame without reversing said pinions, substantially as described.

6. The combination of the receptacle or vessel, the supporting-frame movable with respect to said vessel, the malt-turning screw supported by said frame and provided with worm-wheels, the worm-shaft for turning said screw-shafts, the three-groove pulley on said worm-shaft, the two-groove pulley on a support movable on said frame, the driving-cord passing around said pulleys in the grooves thereof, as specified, and means—such as a screw—for adjusting the support of said two-groove pulley, substantially as described.

7. The combination, with the mechanical malt-turner supported on rollers and advanced by means of pinions engaging racks on the case, of the carriage having rails adapted to receive the wheels of said mechanical turner, and racks adapted to form continuations of the racks on said case, substantially as described.

8. The combination, with the portable turning apparatus, of the carriage mounted on rollers, those on one side being smaller than those on the other, so that the carriage is normally inclined, said carriage being provided with lifting-screws, whereby it can be raised to a vertical position in transferring the turning apparatus to or from a case, substantially as described.

9. In a malt-turning apparatus, the combination of a vessel or receptacle for the malt, a tubular frame movable with respect to said vessel, the turning screws and their shafts supported by said frame, and gearing inclosed by the tubular frame for moving the same and for transmitting motion to said screw-shafts, substantially as described.

In testimony whereof I have signed this specification in the presence of two subscribing witnesses.

JULES ALPHONSE SALADIN.

Witnesses:
    A. ROUSSEL,
    V. FOUR.